(12) United States Patent
Ponzio et al.

(10) Patent No.: US 12,328,048 B2
(45) Date of Patent: Jun. 10, 2025

(54) STATOR, ELECTRIC MACHINE, CONNECTION BRIDGE AND METHOD FOR MANUFACTURING A STATOR

(71) Applicant: ATOP S.p.A., Barberino Tavarnelle (IT)

(72) Inventors: Massimo Ponzio, Siena (IT); Rubino Corbinelli, Staggia Senese (IT); Daniele Nocciolini, Florence (IT)

(73) Assignee: ATOP S.p.A., Barberino Tavarnelle (IT)

( * ) Notice: Subject to any disclaimer, the term of this patent is extended or adjusted under 35 U.S.C. 154(b) by 235 days.

(21) Appl. No.: 18/246,101

(22) PCT Filed: Sep. 28, 2021

(86) PCT No.: PCT/EP2021/076603
§ 371 (c)(1),
(2) Date: Mar. 21, 2023

(87) PCT Pub. No.: WO2022/083983
PCT Pub. Date: Apr. 28, 2022

(65) Prior Publication Data
US 2023/0369932 A1 Nov. 16, 2023

(30) Foreign Application Priority Data
Oct. 20, 2020 (EP) .................................... 20202710

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 3/14* (2013.01); *H02K 3/50* (2013.01);
(Continued)

(58) Field of Classification Search
CPC .. H02K 3/12; H02K 3/28; H02K 3/50; H02K 2203/09
See application file for complete search history.

(56) References Cited

U.S. PATENT DOCUMENTS

| 3,742,122 A | 6/1973 | Blavos et al. | |
| 7,723,879 B2 * | 5/2010 | Fujii | .................... H02K 15/085 310/201 |

(Continued)

FOREIGN PATENT DOCUMENTS

| DE | 102017213883 A1 | 2/2019 |
| DE | 102017214883 | 2/2019 |

(Continued)

*Primary Examiner* — Oluseye Iwarere
*Assistant Examiner* — Minki Chang
(74) *Attorney, Agent, or Firm* — Haley Guiliano LLP; Jeffrey H. Ingerman

(57) ABSTRACT

The invention relates to a stator which may be used within an electric rotating machine and a method for manufacturing a stator. The stator (200) comprises a stator core (100) having a plurality of slots (101, 101a, 101b) arranged in circumferential direction (C) of the stator core (100), a plurality of conductors (102, 103) forming a stator winding, wherein at least a radially outer conductor (102) and a radially inner conductor (103) are arranged along a radial direction (R) of each slot (101). At least one pair of a radially outer conductor (102) of a first slot (101a) and a radially inner conductor (103) of a second slot (101b) circumferentially spaced from the first slot (101a) is electrically connected by a connection bridge (1). The connection bridge (1) comprises a first base element (2) and a second base element (3) connected to a respective conductor (102, 103) and a top element (4) being connected to the base elements (2, 3) and preferably arranged in a larger distance from the stator core (100) than the first base element (2) and second base element (3).

22 Claims, 10 Drawing Sheets

Figure 2A:
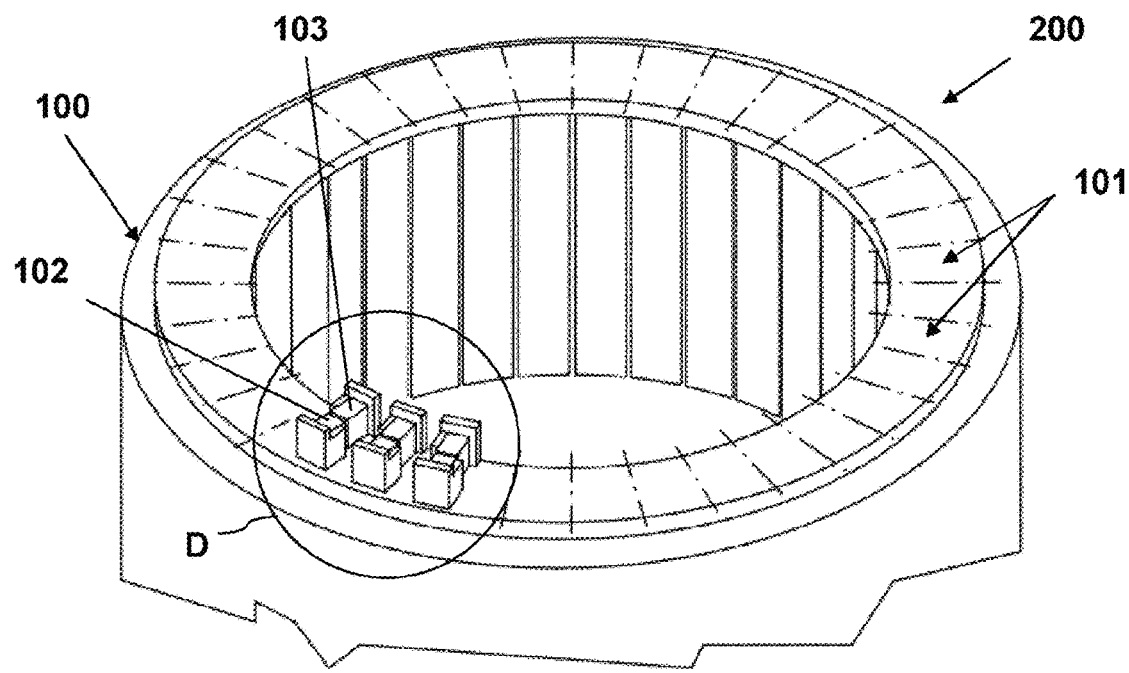

(51) Int. Cl.
  *H02K 3/14* (2006.01)
  *H02K 3/50* (2006.01)
  *H02K 15/33* (2025.01)

(52) U.S. Cl.
  CPC ......... *H02K 15/33* (2025.01); *H02K 2203/06* (2013.01)

(56) References Cited

U.S. PATENT DOCUMENTS

| | | | |
|---|---|---|---|
| 2013/0200743 | A1 | 8/2013 | Okimitsu |
| 2016/0308413 | A1* | 10/2016 | Ciampolini ............ H02K 15/35 |
| 2020/0044495 | A1* | 2/2020 | Hattori ................. H02K 15/026 |
| 2021/0249915 | A1* | 8/2021 | Degner ................. H02K 1/165 |
| 2023/0299632 | A1* | 9/2023 | Kerschbaumer ......... H02K 3/28 310/68 R |

FOREIGN PATENT DOCUMENTS

| | | |
|---|---|---|
| EP | 2437378 | 4/2012 |
| EP | 3082228 | 10/2016 |
| EP | 3082229 | 10/2016 |
| EP | 3088124 | 3/2018 |
| EP | 3683940 | 7/2020 |

\* cited by examiner

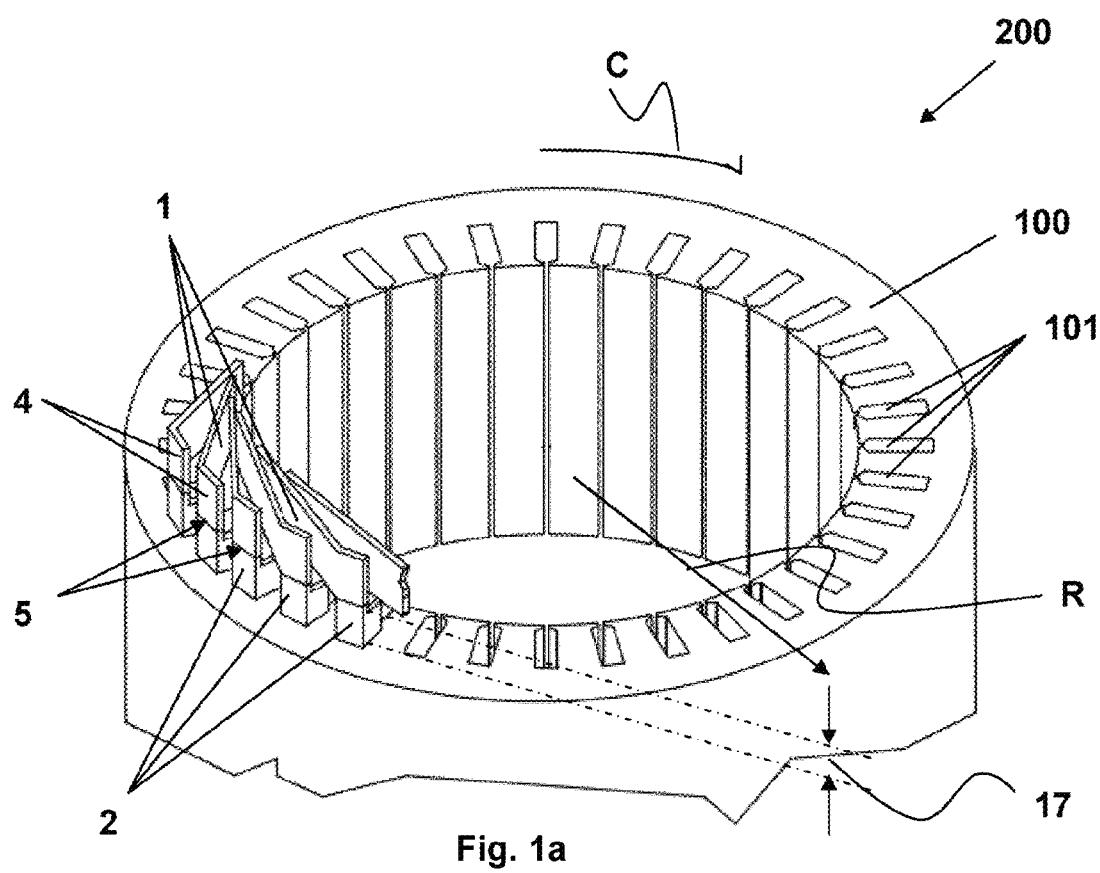
Fig. 1a
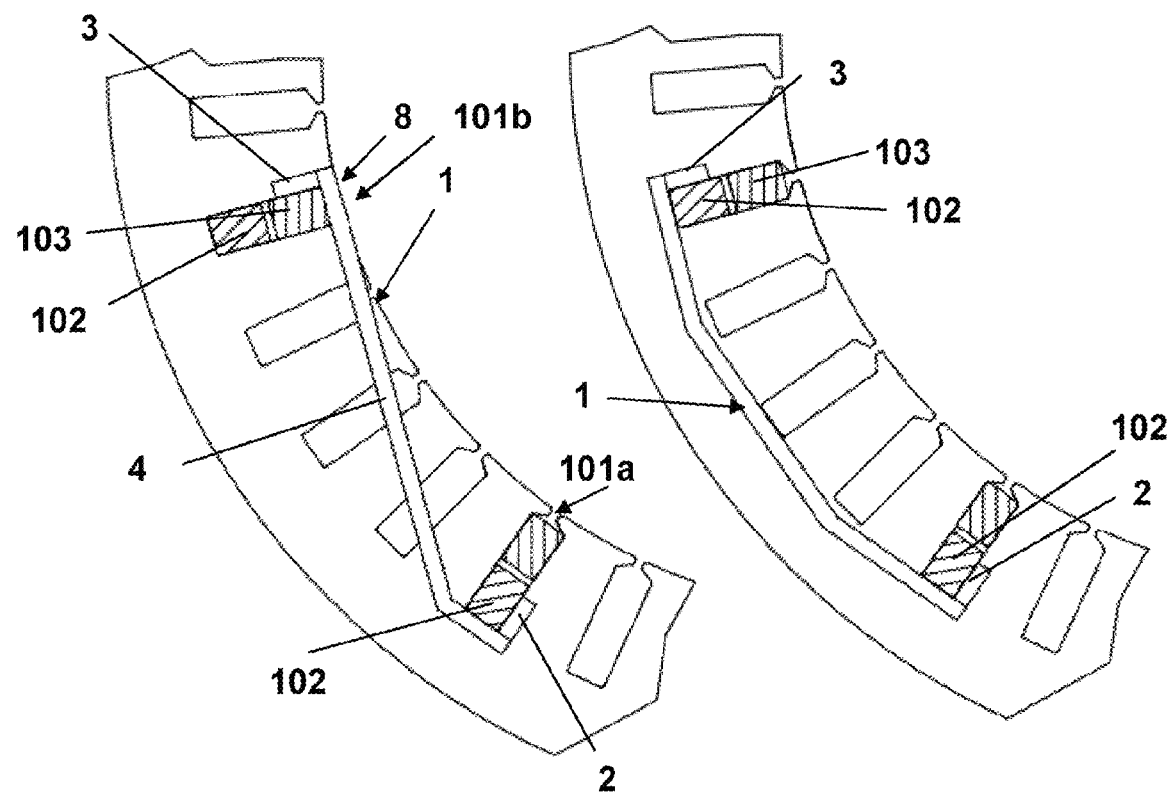
Fig. 1b
Fig. 1c

STATOR, ELECTRIC MACHINE, CONNECTION BRIDGE AND METHOD FOR MANUFACTURING A STATOR

CROSS-REFERENCE TO RELATED APPLICATIONS

This application is a national stage application under 35 U.S.C. § 371 of International Application No. PCT/EP2021/076603, filed Sep. 28, 2021, which claims the benefit of and priority from European Patent Application No. 20202710.8, filed Oct. 20, 2020, the contents of each of which are hereby incorporated by reference herein in their entirety.

The invention relates to a stator which may be used in an electric rotating machine, an electric machine, a connection bridge and a method for manufacturing a stator.

Usually a plurality of slots is formed in a stator core for electric machines such as motors. The slots extend in an axial direction of the stator. The stator comprises a stator winding made of conductors having an in-slot portion disposed in the slots.

A stator winding may be made by means of conductors comprising rigid bars which are axially inserted into the stator slots. These conductors may be "U"-shaped, wherein the ends of the "U" may be connected to other conductors. Conductors may also have free end sections on both sides of the stator core for connection to other conductors.

Free end sections protruding from the stator core typically are free from a separate insulating member so that an electrical connection with a free end section of another conductor is possible. Insulating sheets may be used for lining the walls of the slots of the stator core. In case of stator assemblies where more than one conductor is inserted into one slot, insulating sheets can also be used for providing insulation between neighbouring conductors.

Respective free end sections of at least some of the conductors are connected to a free end section of another conductor by means of welding to form electrical paths of the stator winding. A connection can be formed by deforming (e.g. twisting) and welding the free end sections of the conductors and/or by providing separate connection bridges.

Connection bridges for connecting ends of non-adjacent legs of "U"-shaped conductors are disclosed in EP3082228 A1 or EP3082229 A1. The connection bridges are housed in an insulating support made of an electrically insulating plastic material which has through holes into which some of the legs are inserted. The insulating support may be formed as a circular arc and comprises a seat for mechanically locking the connection bridge in the correct position.

EP2437378 A1 discloses a method of welding electrically connecting twisted ends of "U"-shaped conductors and connection bridges with respective twisted ends of the conductors.

The connection bridges are flat elements. Connection bridges arranged in one insulating support can bridge only limited circumferential distances, such that the method mainly is suitable for twisted ends of conductors. Otherwise a large number of layered insulating supports would be necessary.

It is therefore an object of the present invention to overcome the drawbacks of the prior art and in particular to provide a stator, an electric machine and a method which allow to form a desired winding arrangement with high accuracy in a simple and reliable way.

According to the invention these and other objects are solved with a stator and a method of forming a stator according to the independent claims.

Within this application the terms axial, circumferential and radial refer to the geometry of the stator.

A stator for a rotating electric machine according to the invention comprises a stator core having a plurality of axial slots arranged circumferentially around the axis of the stator core. The stator further comprises a plurality of conductors forming a stator winding, wherein at least a radially outer conductor and a radially inner conductor are arranged along a radial direction of each slot.

At least two conductors are arranged in each slot. Alternatively, more than two conductors may be arranged in one slot, in particular for forming more than two circumferential winding layers.

Axial end sections of the conductors protrude from the slots on at least one side of the stator core.

Typically, the axial end sections are those sections which are free from a separate insulating member. The axial end sections may comprise an insulating coating, which is removed when an electrical contact is established.

At least one pair of a conductor of a first slot and a conductor of a second slot circumferentially spaced from the first slot is electrically connected by a connection bridge on at least one axial side of the stator core. The second slot is different from the first slot.

Preferably, the connection bridge connects a radially outer conductor of the first slot and a radially inner conductor of the second slot.

Almost all axial end sections of the conductors are connected to another axial end section, such that one or more windings are formed. Some axial end sections may not be connected to another end section thereby providing for an external electric connection.

The connection bridge comprises a first base element and a second base element respectively connected to the ends of a respective conductor. The connection bridge further comprises a top element connected to the base elements. The top element is arranged at a larger distance from the stator core than the first base element and second base element.

Within this application "distance from the stator core" means the minimal axial distance to the axial surface of the stator core.

The connection bridges span the radial, axial and circumferential distances between the respective axial end sections.

The first and the second base element may be arranged with the same axial distance with respect to the stator core or with a different distance. The first and/or second base elements may be arranged directly on the axial surface of the stator core, preferably only separated by an insulating layer. The top element may be arranged on top of the first and second base elements.

The connection bridge is not necessarily a flat element, where all parts are arranged in the same axial level.

The connection bridge typically is made of three separate parts which are connected when the electrical connection between the conductors is formed. Preferably, there is a weld between the first base element and the top element as well as between the second base element and the top element.

The base elements may be connected to the ends of the conductors before the top element is connected to the base elements.

As the top element may not yet be present when the base elements are connected, accessibility during welding may be much easier, than for connecting a complete connection bridge.

The first base element may embrace at least one lateral part and/or an outwardly facing part of the surface of the axial end section of the radially outer conductor.

The first base element may additionally contact a radially inwardly facing part of the radially outer conductor. The first base element may have a radially inwardly open L-shape, an O-shape or similar shape.

The second base element may embrace at least one lateral part and/or an inwardly facing part of the surface of the axial end section of the radially inner conductor.

The second base element may additionally contact a radially outwardly facing part of the radially inner conductor. The second base element may have a radially outwardly open L-shape, O shape or similar shape.

Parts of the surface of the base elements abutting the conductors may be welded to the respective axial end section of the conductors.

The top element may comprise a first connection end having a preferably axial contact face in contact with a preferably axial face of the first base element. The top element further may comprise a second connection end having a preferably axial contact face in contact with a preferably axial face of the second base element. The contact faces of the connection ends may be welded to the corresponding faces of the base elements.

The contact faces of one top element may be arranged at the same axial distance with respect to the stator core, when the first and the second base element are arranged in the same axial distance with respect to the stator core. The contact faces of one top element may be arranged with different axial distances with respect to the stator core, when the first and the second base element are arranged on different axial levels with respect to the stator core.

The stator may comprise a plurality of connection bridges.

The first base elements may be arranged within a first region of a lower, preferably annular, holding member. The second base elements may be arranged within a second region of the lower, preferably annular, holding member.

The first region is a radially inner region, the second region an radially outer region.

The first and the second regions of the lower holding member may be separate parts or may be formed as one integral single part.

Preferably, the first base elements and/or the second base elements are arranged side by side in a circumferential direction in the respective holding member.

The first region of the lower holding member and the second region of the lower holding member may be arranged with the same axial distance to the stator core or with different axial distances.

The lower holding member may have through holes in which axial end sections of the conductors in the stator slots are arranged to be in contact with the base elements.

The top elements may be arranged within an upper, preferably annular, holding member.

Preferably, the top elements are arranged in the upper holding member side by side in a circumferential direction.

The upper holding member may be arranged at a larger distance from the stator core than the lower holding member, such that the top elements may be arranged on top of the base elements.

Preferably the lower holding member and/or the upper holding member are made from an insulating material and may comprise a body made of resin material. The body may have an annular shape to cover a complete circumferential section of the stator core.

Connection ends of the top elements may protrude from the axial side of the upper holding element which faces the stator core. Base elements may protrude from the axial sides of the lower holding member which face away from the stator core.

The lower holding member and/or the upper holding member may comprise at least one reference mark, in particular a radially extending protrusion. The reference mark allows a circumferential alignment of the upper and lower holding members during manufacturing in order to connect corresponding base and top elements and thereby to connect corresponding conductors.

The lower holding member and/or the upper holding member may comprise at least one spacer element for defining an axial distance to the stator core and/or to the axially adjacent holding member, in particular an axially extending protrusion.

The spacer element axially extending in a direction towards the stator core may provide an axial positioning of the lower holding members with respect to the stator core during manufacturing in order to axially align respective axial end sections of the conductors and base elements.

A spacer element may also provide axial positioning of the upper holding member with respect to the lower holding member during manufacturing in order to provide a defined distance and a space for a connecting tool.

The lower holding member may comprise chamfered openings for introducing ends of the conductors. Axial end sections of the conductors may easily be inserted into the openings during manufacturing to come into contact with respective base elements.

The first base element and/or the second base element may comprise anchoring openings at a lateral side. The anchoring openings allow a reliable connection between the base elements and the lower holding elements. Resin material of the body of the lower holding elements may penetrate into the opening and strengthen the fixation between the base element and the lower holding element.

The first base element may be arranged at a first axial level, and the second base element may be arranged at a second axial level different from the first axial level. For example the second base element may be arranged closer to the stator core than the first base element.

This arrangement is particularly beneficial when axial end sections of radially inner and radially outer conductors are axially distanced from each other, such that the distance between a proximal end of the axial end section of a first conductor and an axial surface of the stator core is longer than the distance between a distal end of the axial end section of a second conductor and the axial surface of the stator core.

On at least one axial side, for example the termination side, of the stator core, a number of first base elements and/or a number of second base elements may be connected to each other to form a termination connection.

The termination side is the axial side of the stator core which is electrically connected or connectable to external conductors when the stator is arranged in a rotating machine.

The termination connection may be formed as a single piece. A first and a second base element connected with conductors arranged within one slot may be formed as a single piece.

The termination connection may be a three phase star connection.

On the termination side of the stator core a number of top elements may be connected by termination bridges, preferably on the radial outside of the top elements.

The terminal bridges may comprise welding openings which for example allow easy access to the connection area between the top element and the base elements for a welding laser tool.

The connection bridges hence may not only allow closing of windings but also connecting the stator to external conductors.

In a preferred embodiment of the stator, the conductors are formed by a plurality of axially extending conductor parts, for example by strands of conducting wires.

According to another aspect of the invention an electric machine comprising a stator as described above is provided.

The stator may comprise a stator core having an external diameter of 200 mm to 250 mm, preferably 220 mm to 225 mm. The internal diameter of the stator core may be 150 mm to 160 mm, preferably 155 mm to 156 mm. The axial length of the stator core may be 50 mm to 200 mm, preferably 125 mm to 130 mm. The stator core may comprise 40 to 100 slots, preferably 45 to 50 slots.

The conductors may have a rectangular cross section with a radial length of 1.5 mm to 11 mm, preferably 4 mm to 10 mm and a circumferential width of 1.5 mm to 6 mm, preferably of 3.9 mm to 4.1 mm.

According to another aspect of the invention a connection bridge for connecting conductors arranged in slots is provided, wherein the slots are arranged in a circumferential direction of a stator core of a stator. Preferably the stator is a stator as described above.

The connection bridge comprises a first base element and a second base element being connectable to respective axial end sections of the conductors. The connection bridge further comprises a top element connectable or connected to base elements.

In particular the top element comprises two preferably axial contact faces for contacting respective preferably axial faces of the first base element and the second base element. Thus the top element may be arranged on top of the base elements.

Before manufacturing of the stator the connection bridge may comprise at least three separate parts, namely the base elements and the top element. The axial contact faces of the top element may be welded to respective preferably axial faces of the base elements during manufacturing of the stator, preferably after the base elements have been welded to respective axial end sections of conductors.

The connection bridges may have a circumferential length of 15 mm-100 mm. The connection bridges typically bridge 6-10 slots. The base elements may have a radial length of 5 mm-20 mm and axial lengths of 2 mm-10 mm.

Adjacent axial faces may be connected by welding with a tool which operates in a radial direction, for example a laser welding tool, where the laser beam has a radial component melting both adjacent axial faces from radially outside or inside.

According to a further aspect of the invention a method for manufacturing a stator for a rotating electric machine is provided, preferably a stator as described above.

The stator comprises a stator core which has a plurality of slots arranged in a circumferential direction of the stator core and a plurality of conductors forming a stator winding. At least a radially outer conductor and a radially inner conductor are arranged along a radial direction of each slot. Axial end sections of the conductors protrude from the slots on at least one side of the stator core.

At least one first base element is connected to an axial end section of a radially outer conductor, preferably by axial welding.

Axial welding means that the welding tool affects the parts to be connected from an axial top side or an axial bottom side. For example, the laser beam of a laser welding tool has a primary axial component (i.e. includes an angle of less than 45° with the axial direction) or is preferably basically parallel to the axial direction.

At least one second base element is connected to an axial end section of a radially inner conductor, preferably by axial welding.

A top element is connected to the first base element, preferably by welding from a radially outer side. For example, the laser beam of a laser welding tool has a primary radial component (i.e. includes an angle of between 45° and 90° with the axial direction) and is preferably basically perpendicular to the axial direction.

The top element is further connected to the second base element, preferably by welding from a radially inner side.

Each base element and each top element may be placed and connected to a respective part in a single step.

Preferably a number of first and/or second base elements are placed in a single step on the respective axial end sections of the conductors. Preferably all first and/or second base elements are placed in a single step.

A first region of a lower holding member carrying first base elements may be provided. The first region of the lower holding member may be placed such that the first base elements are close to the axial end sections of radially outer conductors.

The first region of the lower holding member may have an annular form or may have the form of a ring section.

Preferably, the first region of the lower holding member is placed such that the first base elements embrace lateral parts and/or outwardly facing parts of the surface of the axial end sections of the radially outer conductors.

The first base elements may then be welded to the axial end sections of the radially outer conductors.

A second region of a lower, preferably annular, holding member carrying second base elements may be provided. The second region of the lower holding member may be placed such that the second base members are arranged close to the axial end sections of radially inner conductors.

The second region of the lower holding member may have an annular form or may have the form of a ring section.

Preferably, the second region of the lower holding member is placed such that the second base elements embrace lateral parts and/or inwardly facing parts of the surface of the axial end sections of the radially inner conductors.

Preferably a lower member comprising a first radially inner and a second radially outer region is provided, such that all first and all second base elements can be placed in one step.

The second base elements may then be welded to the axial end sections of the radially inner conductors.

An upper holding member carrying top elements may be provided. The upper holding member may have a form corresponding to the lower holding members and preferably may be annular.

The upper holding member may be placed close to the first region of the lower holding member and the second region of the lower holding member after connecting the first base elements to the ends of radially outer conductors and the second base elements to the axial end sections of the radially inner conductor.

Preferably, the second region of the lower holding member is placed such that preferably axial contact faces of the top elements contact respective preferably axial faces of the first base elements and the second base elements.

The top elements may then be welded to the base elements.

All first base elements carried by the first region of the lower holding member, all second base elements carried by the second region of the lower holding member and/or all top elements carried by the upper holding member may be placed in one step respectively.

For forming a winding of a stator conductors have to be connected on both axial sides of the stator core. Hence a first region of a lower holding member for the first axial side, a first region of a lower holding member for the second axial side, a second region of the lower holding member for the first axial side, a second region of the lower holding member for the second axial side, an upper holding member for the first axial side and an upper holding member for the second axial side have to be provided.

In a first alternative embodiment of a method for forming a winding, radially inner conductors and radially outer conductors may be directly positioned in slots of a stator core such that the axial end sections protrude from the first and the second axial side of the stator core.

Axial end sections of the radially outer conductors are connected with first base elements arranged in the first region of the lower holding member and ends of radially inner conductors are connected with second base elements arranged in the second region of the lower holding member on the first axial side, preferably by axial welding.

Axial end sections of the radially outer conductors are connected with first base elements arranged in the first region of the lower holding member and ends of radially inner conductor elements are connected with second base elements arranged in the second region of the lower holding member on the second axial side, preferably by axial welding.

Finally upper holding members are connected to the lower holding members on both sides. In particular top elements of the upper holding members are welded to first base elements of the first region of the lower holding members, preferably from a radially outer side. Top elements of the upper holding members are welded to second base elements of the second region of the lower holding member, preferably from a radially inner side.

Alternatively, instead of directly positioning non connected conductors in slots of the stator core, subassemblies may be formed in advance in a stator assembly. The method for forming a winding may comprise the further following steps.

Radially inner conductors may be provided in a stator template. A stator core template typically comprises circumferentially arranged and axially extending slots and has basically the same dimensions as the stator core where the conductors are finally to be placed.

Axial end sections of the radially inner conductors may be connected with second base elements arranged in a second region of a lower holding member which is arranged on the first axial side. This lower holding member further comprises a first region carrying first base elements which is fixed to the second region of the lower holding member on this first axial side. The first region of the lower holding member and the second region of the lower holding member of the first axial side as well as the inner conductors form an inner subassembly.

The first region of the lower holding member of the inner subassembly provides first base elements which are not yet connected to conductors.

Radially outer conductors may also be provided in a respective stator template. Axial end sections of radially outer conductors may be connected to first base elements arranged in the first region of the lower holding member on the second axial side. The lower holding member may comprise a second region carrying second base elements which is connected to the first region of the lower holding member on the second axial side. The first region of the lower holding member and the second region of the lower holding member of the second axial side as well as the outer conductors form an outer subassembly.

The second region of the lower holding member of the outer subassembly provides second base elements which are not yet connected to conductors.

The conductors of the inner subassembly may be introduced into respective slots of a stator core from the first axial side.

The conductors of the outer subassembly may be introduced into the respective slots of the stator core from the second axial side opposite to the first axial side.

The first axial side may be a side opposite to the termination side, whereas the second axial side may be a termination side. On the termination side, the stator may be electrically connected to an external electrical conductor.

The slots preferably are lined with insulators before the conductors are inserted, such that the conductors neither get into contact with the walls of the slots nor with neighbouring conductors in the same slot.

The axial end sections on the first axial side of the radially outer conductors of the outer subassembly may then be connected with the first base elements of the inner subassembly. The first base elements of the inner subassembly are arranged in the first region of the lower holding member on the first axial side.

The axial end sections on the second axial side of the radially inner conductors of the inner subassembly may be connected with second base elements of the outer subassembly. The second base elements of the outer subassembly are arranged in the second region of the lower holding member on the second axial side.

Finally upper holding members may be connected to the lower holding members on both axial sides.

In particular top elements arranged in an upper holding member may be welded to base elements of the first region of the lower holding member, preferably from a radially outer side. Top elements of the upper holding member may be welded to second base elements of the second region of the lower holding member, preferably from a radially inner side.

Figure 2B:
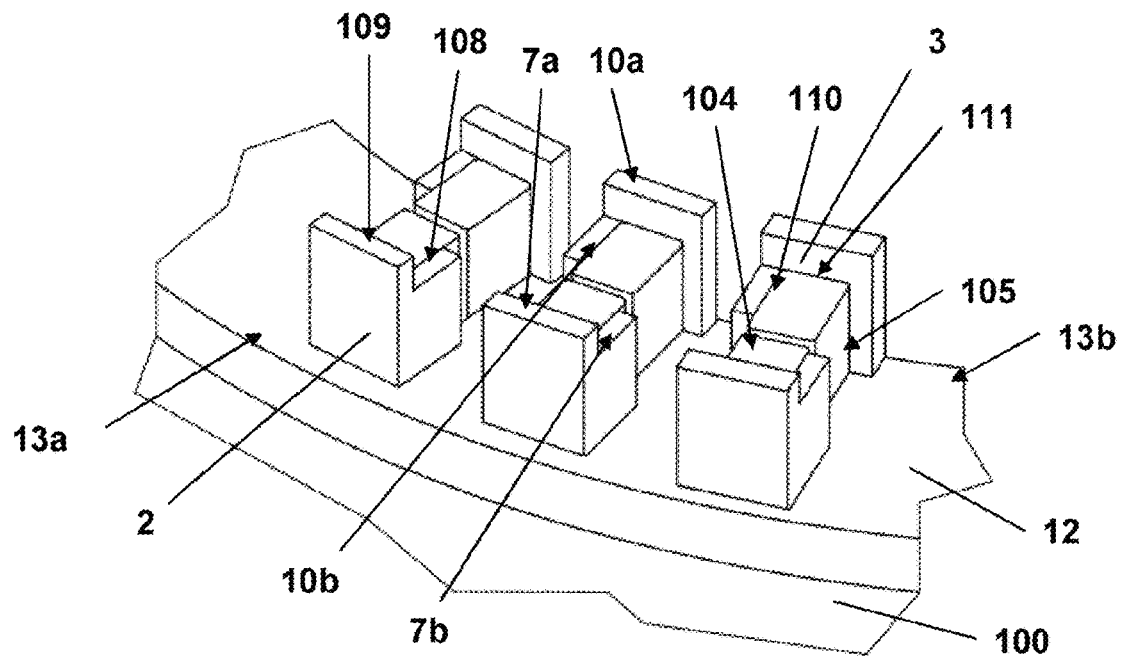
Figure 3:
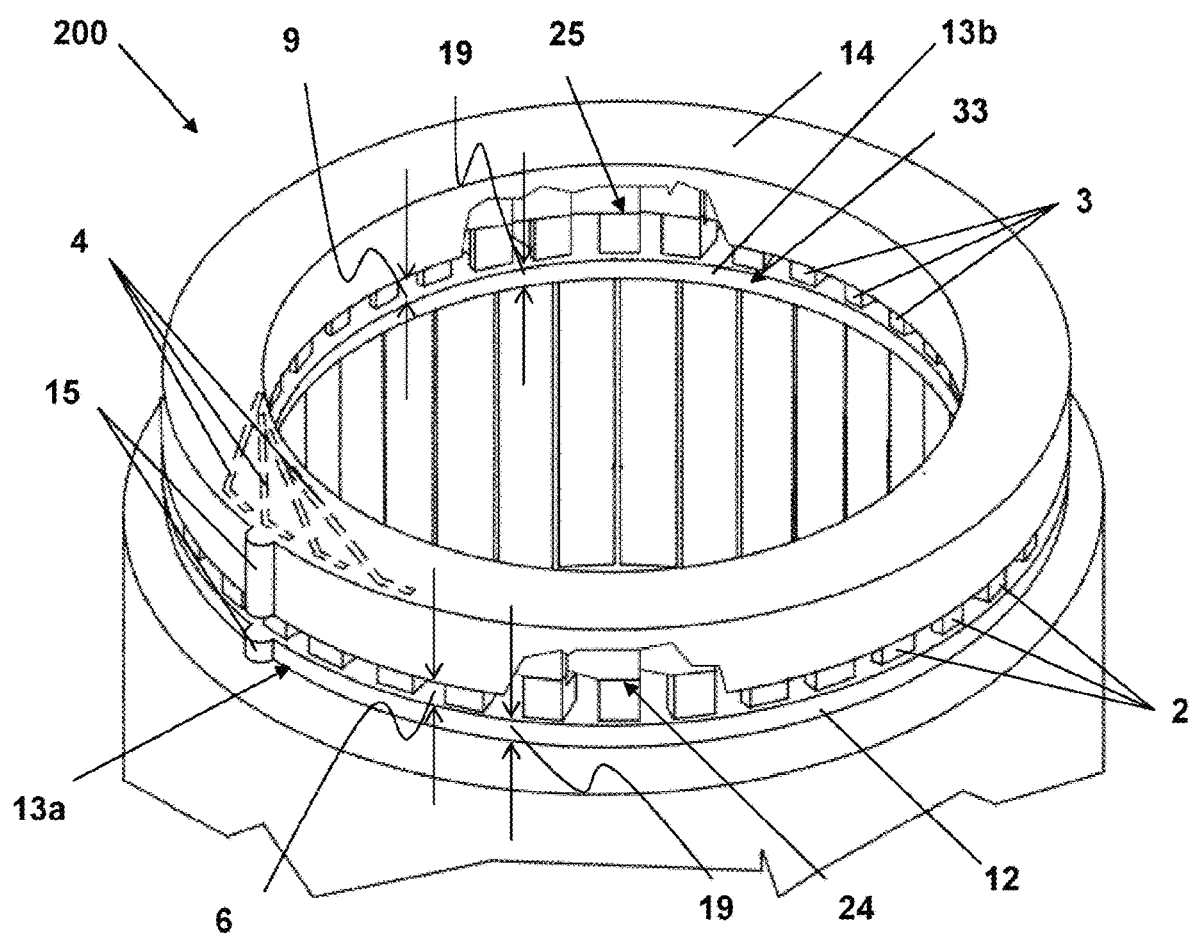
Figure 4:
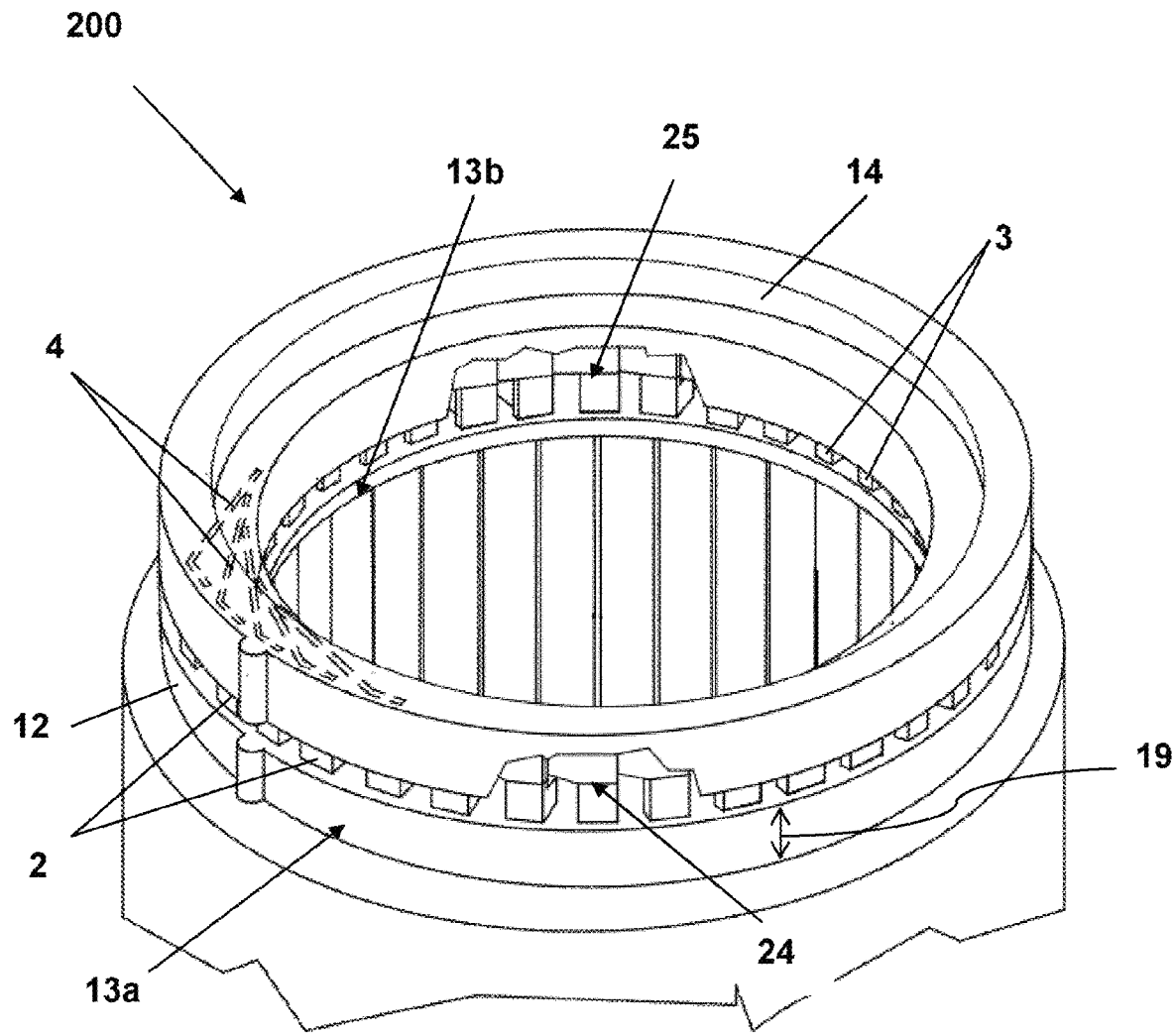
Figure 5:
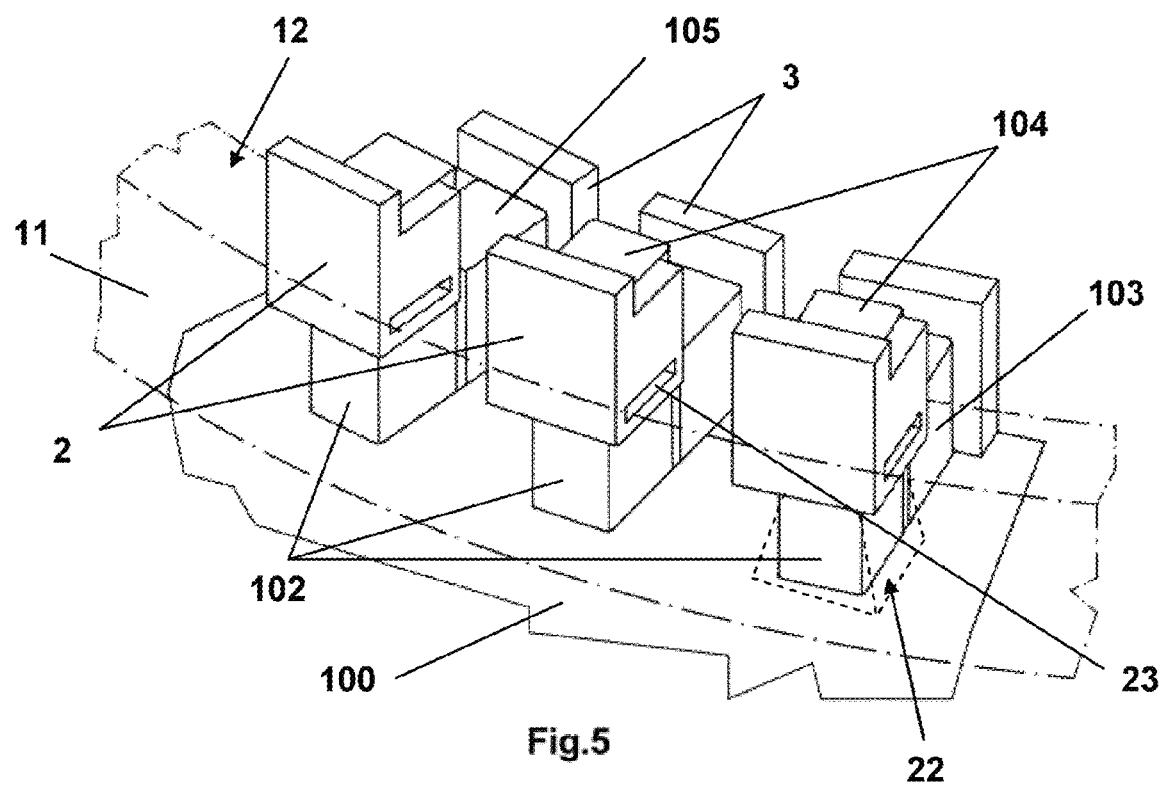
Figure 6:
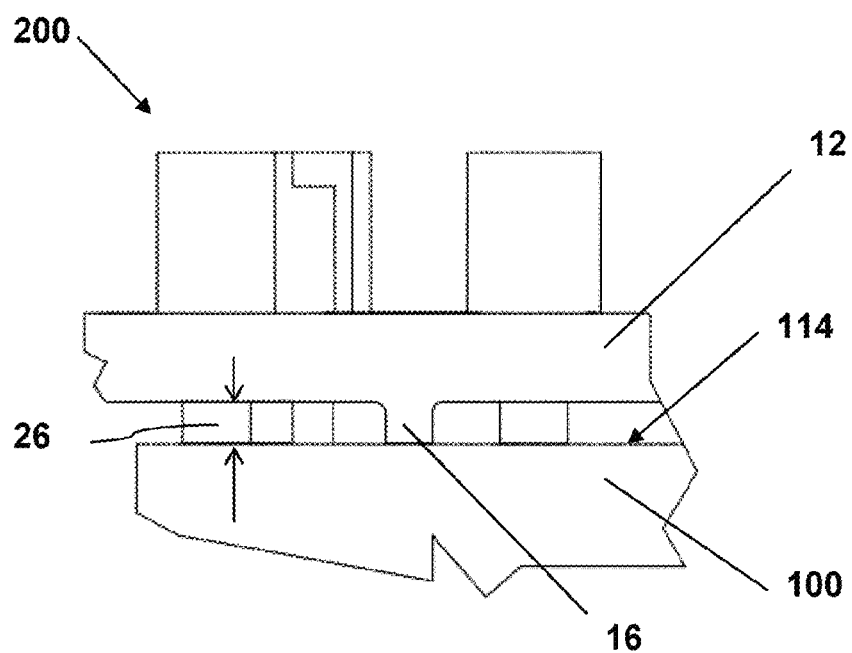
Figure 7:
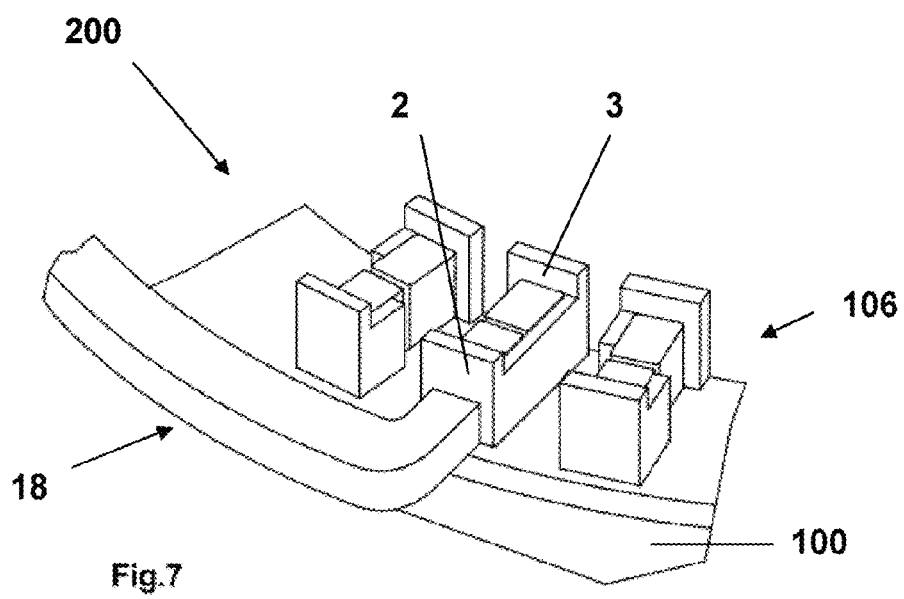
Figure 8:
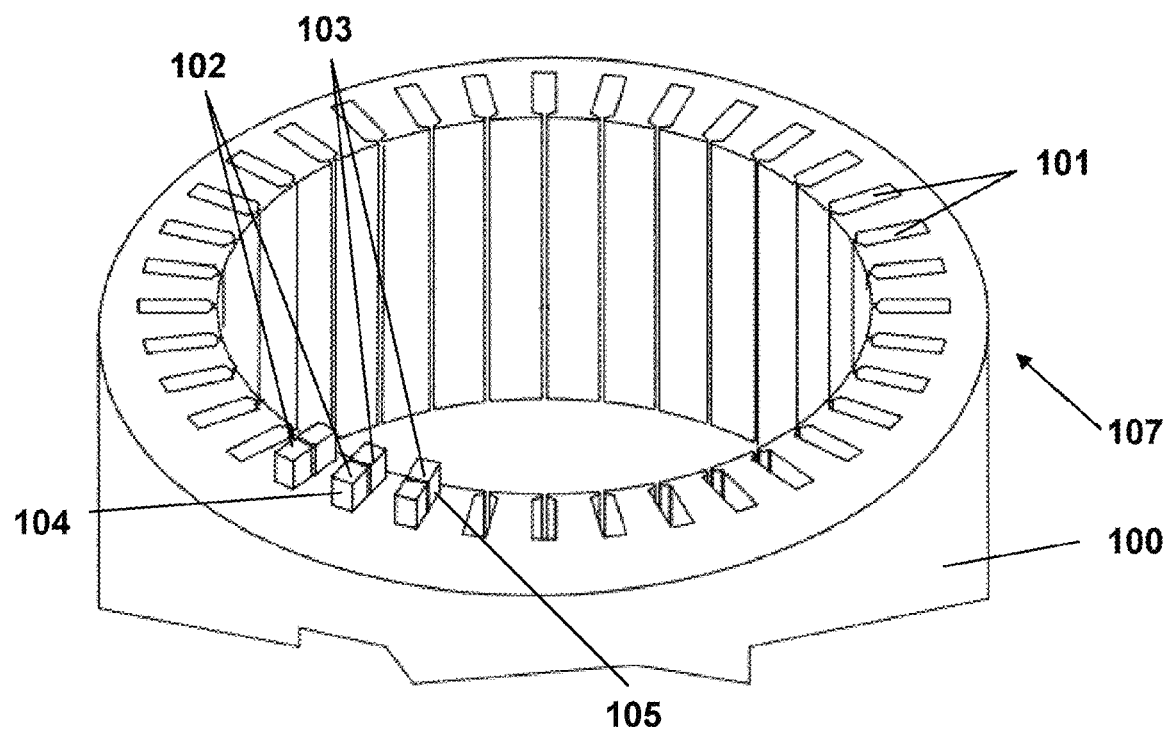
Figure 9:
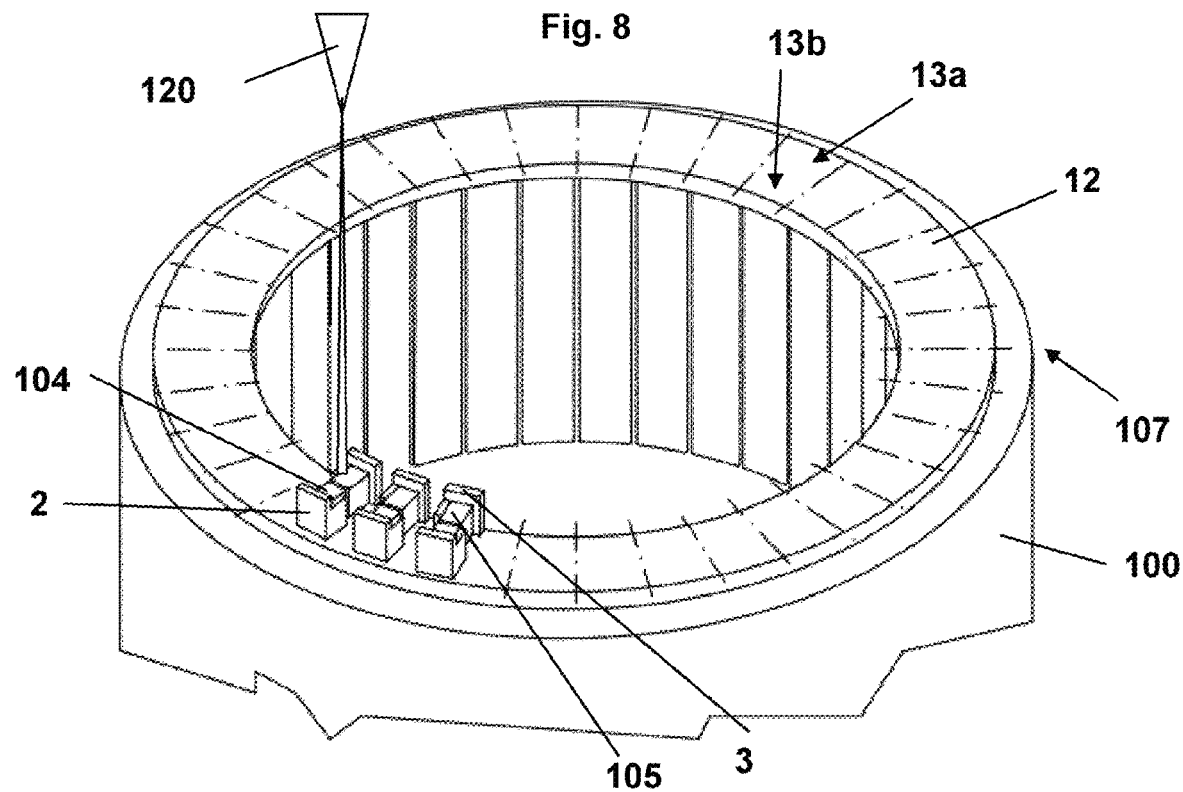
Figure 10:
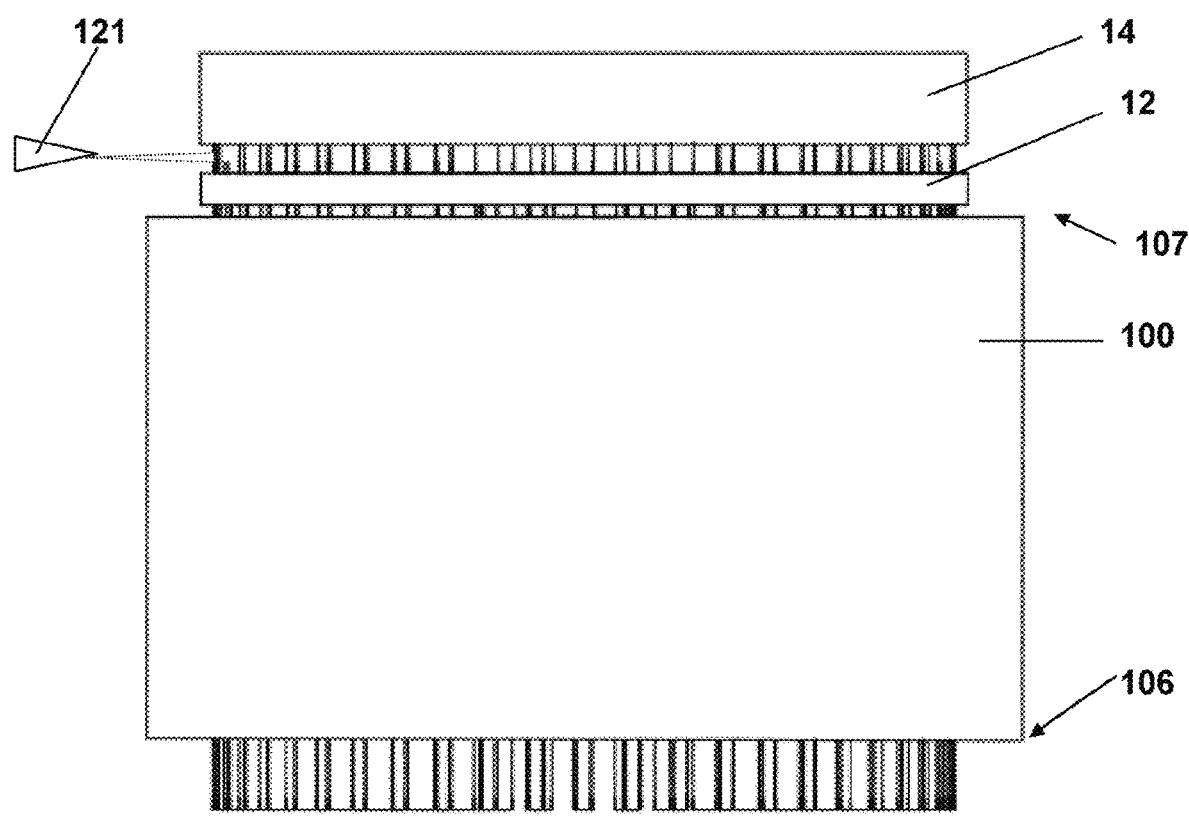
Figure 11:
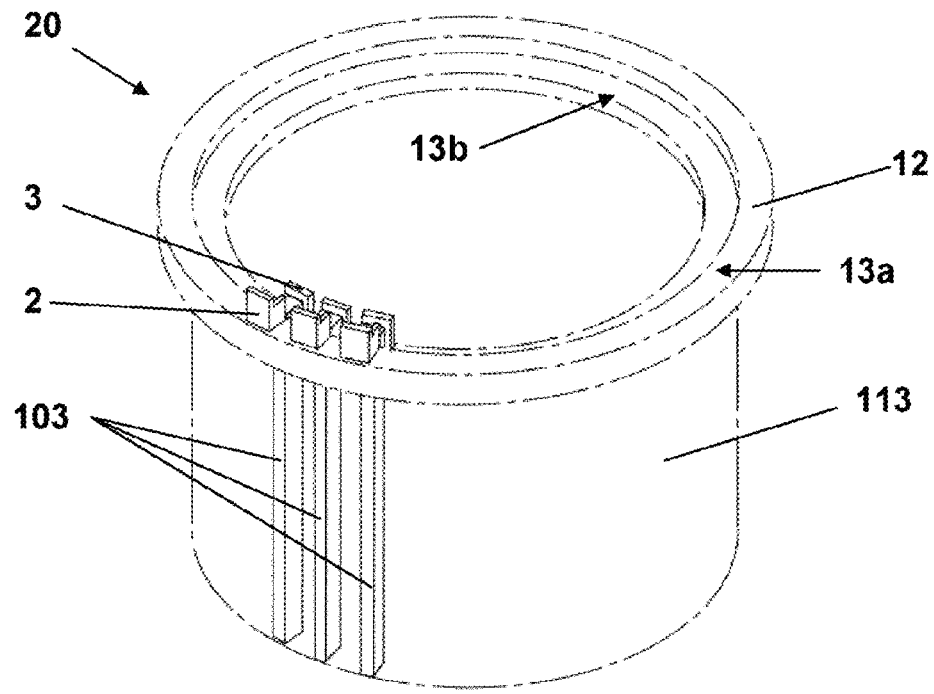
Figure 12:
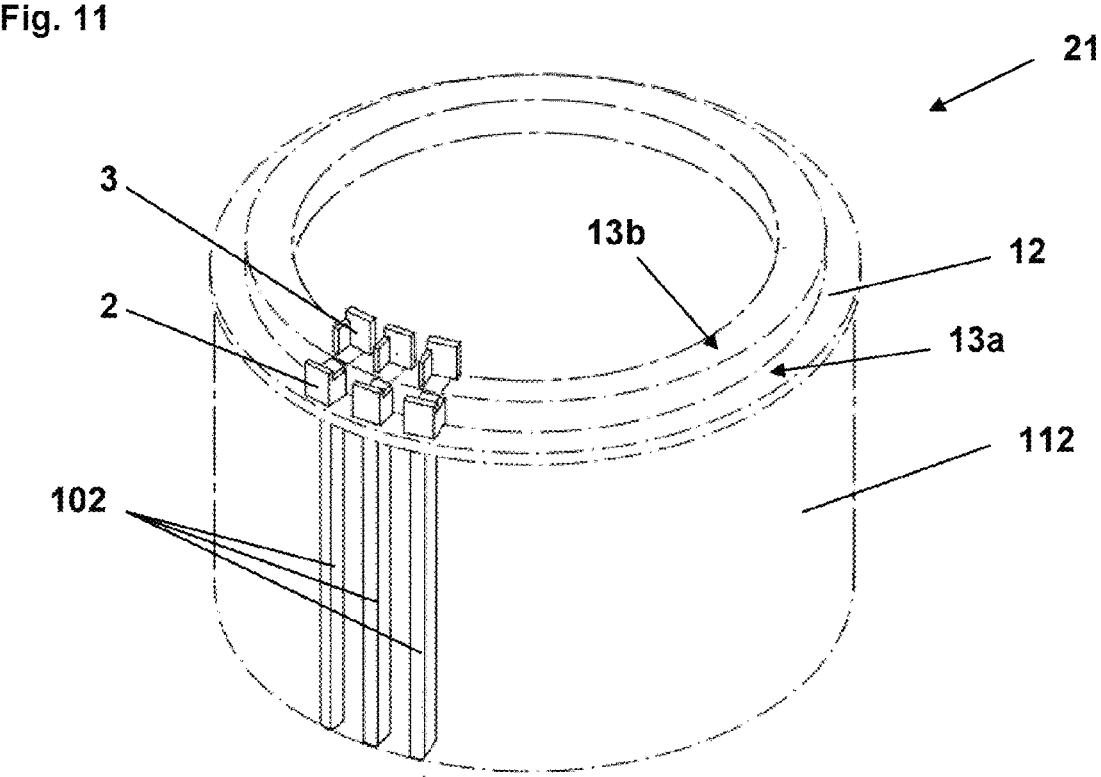
Figure 13:
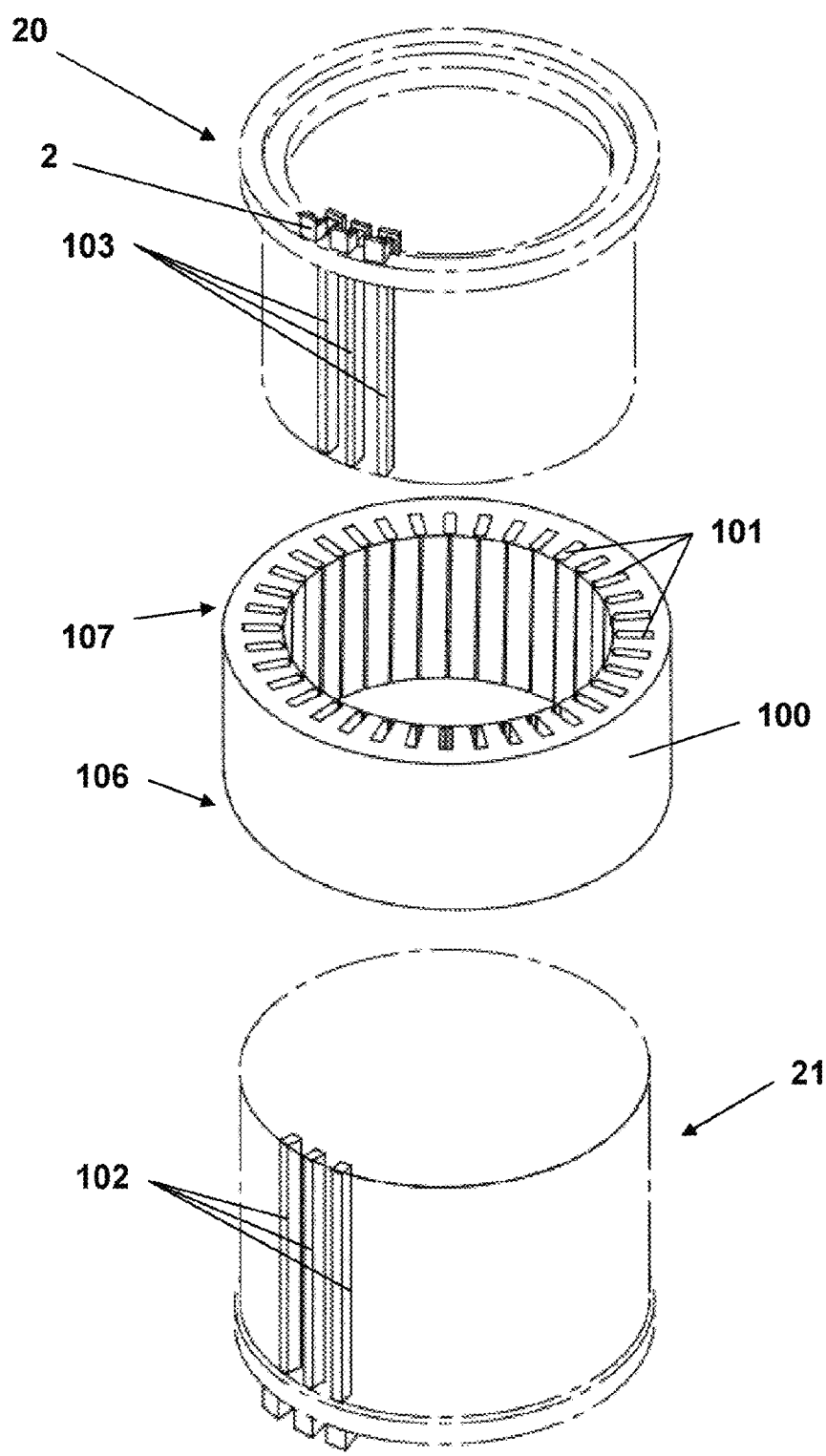

The invention will now be described with reference to preferred embodiments and the drawings, which show:

FIG. 1a a part of a first embodiment of a stator in a perspective view;

FIG. 1b a part of the first embodiment of a stator with a first example of a connection bridge in top view;

FIG. 1c a part of the first embodiment of a stator with a second example of a connection bridge in top view;

FIG. 2a a part of the first embodiment of a stator in a perspective view;

FIG. 2b a detail view of FIG. 2a;

FIG. 3 a part of the first embodiment of a stator in a perspective view;

FIG. 4 a part of a second embodiment of a stator in a perspective view;

FIG. 5 a detailed view of a part of the embodiment of FIG. 4;

FIG. 6 a detailed view of a part of a stator in a side view;

FIG. 7 a detailed view of a part of the first embodiment of a stator in a perspective view;

FIGS. 8-10 schematically steps of a first method for forming a stator;

FIG. 11 an inner subassembly of the second embodiment of a stator in a perspective view;

FIG. 12 an outer subassembly of the second embodiment of a stator in a perspective view;

FIG. 13 schematically steps of a second method for forming a stator.

FIG. 1a shows a first embodiment of a stator 200 in a perspective view. The stator 200 comprises a cylindrical stator core 100 with axially extending slots 101 arranged in circumferential direction C.

Each slot 101 contains a radially outer conductor 102 and a radially inner conductor 103 (see FIGS. 1a, 1b) arranged along a radial direction R. For the sake of clarity only a few of the conductors 102, 103 are shown.

The conductors 102, 103 are connected by connection bridges 1.

The connection bridges 1 each comprise a first base element 2, a second base element 3 and a top element 4 being connected to the base elements 2, 3 at connection ends 5, 8.

The base elements 2, 3 are arranged close to the stator core 100, whereas the top elements 4 are arranged on top of the first and second base elements 2, 3 and thus at a larger distance 17 from the stator core 100 than the first base elements 2 and the second base elements 3.

As can be seen in FIG. 1b the connection bridge 1 may connect an outer conductor 102 of a first slot 101a and in inner conductor 103 of a second slot 101b or as shown in FIG. 1c, the connection bridge 1 may also connect two outer conductors 102.

Alternatively, the connection bridge 1 may connect an inner conductor 103 of a first slot 101a and an inner conductor 103 of a second slot 101b, not shown in the figures.

FIG. 2a shows a part of the first embodiment of a stator 200 in a perspective view. FIG. 2b shows a detail D of FIG. 2a.

Axial end sections 104, 105 of the conductors 102, 103 protrude from the slots 101, which are only schematically shown.

The first base elements 2 embrace a lateral part 108 and an outwardly facing part 109 of the surface of the axial end section 104 of radially outer conductors 102.

The second base elements 3 embrace a lateral part 110 and an inwardly facing part 111 of the surface of the axial end section 105 of the radially inner conductors 103.

The first base elements 2 are arranged in a radially outer first region 13a of a lower annular holding member 12 and the second base elements 3 are arranged within a radially inner second region 13b of the lower annular holding member 12.

The first and second base elements 2, 3 may be connected to the inner and outer conductors 102, 103 by axially welding to form a reliable electrical connection.

The first base elements 2 comprise axial faces 7a, 7b for contacting first connection ends 5 of the top element 4 (see FIG. 1a). The first connection ends 5 have an axial contact face (not explicitly shown) which may be brought into contact with the axial faces 7a, 7b.

Analogously the second base elements 3 have axial faces 10a, 10b for contacting a second connection end 8 of top element 4 (see FIG. 1a). The second connection ends 8 have an axial contact face (not explicitly shown) which may be brought into contact with the axial faces 10a, 10b.

Axial faces 7a, 7b may be arranged in the same plane or, as shown in the figures, may be arranged in different planes. The same holds for the axial faces 10a, 10b. The lower axial faces 7b may be on the same axial level as the outer conductors 102 and the lower axial faces 10b may be on the same axial level as the inner conductors 103.

An axial welding tool 120 (see FIG. 9) may be directed to an area between the lower axial face 7b and the outer conductor 102 to form a connection between the first base element 2 and the outer conductor 102.

Analogously an axial welding tool 120 (see FIG. 9) may be directed to an area between the lower axial face 10b and the inner conductor 103 to form a connection between the second base element 3 and the inner conductor 103.

The top elements may be connected to the first and second base elements 2, 3 by radially welding to form a reliable electrical connection.

FIG. 3 shows a part of the first embodiment of a stator 200 in a perspective view.

The first base elements 2 are arranged within the first region 13a of the lower annular holding member 12 and the second base elements 3 are arranged within the second region 13b of the lower annular holding member 12.

A radial welding tool 121 (see FIG. 10) may be directed to a connection area 24 between the upper axial face 7a and a respective top element from a radial outside of the stator core 100, and analogously to a connection area 25 between the upper axial face 10a and a respective top element from the radial inside of the stator core 100.

All first base elements 2 and all second base elements 3 may be positioned with respect to the outer conductors 102 (see FIGS. 1a, 1b, 1c) and the inner conductors 103 (see FIG. 1a, 1b, 1c) in one step.

The top elements 4 are arranged within an upper annular holding member 14.

The holding members 12 and 14 are made of resin, such as thermal resistant polyamide PA, such as PIC.

The upper holding member 14 may positioned on the first lower holding member 12, such that all top elements 4 are arranged on respective first and second base elements 2, 3 in one step. To facilitate circumferential alignment the lower holding member 12 and the upper holding member 14 each comprise a radially extending protrusion 15.

There is a distance 6 between the first region 13a of the lower holding member 12 and the upper holding member 14 and a distance 9 between the second region 13b of the lower holding member 12 and the upper holding member 14. In this embodiment the distances 6, 9 are equal.

The connection areas 24 between the axial faces 7a (see FIG. 2b) of the first base elements 2 and the top elements 4 are arranged between the lower holding member 12 and the upper holding member 14 such that a radial welding tool 121 may be directed to the areas 24 from a radial outside of the stator 200.

Accordingly, the connection areas 25 between the axial faces 10a (see FIG. 2b) of the second base elements 3 and the top elements 4 are arranged between the lower holding member 12 and the upper holding member 14 such that a radial welding tool 121 may be directed to the areas 25 from a radial insider of the stator 200.

The distances 6, 9 allow a welding tool 121 (see FIG. 10) accessing the first base elements 2 and the top elements 4 from a radial outside and the second base elements 3 and the top elements 4 from a radial inside.

In the embodiment of FIG. 3, the first region 13a of the lower holding member 12 and the second region 13b of the lower holding member 12 have the same axial height 19.

The axial faces 7a of the first base elements 2 and the axial faces 10a of the second base elements 3 are arranged on the same respective axial levels as for example shown in FIG. 2b.

In an alternative embodiment, axial end sections 104, 105 of the inner and of the outer conductors may be arranged at different axial levels as shown in FIG. 5.

FIG. 4 shows a part of a second embodiment of a stator 200 in a perspective view, wherein the first region 13a of the lower holding member 12 has a longer axial height 19 than the second region 13b of the holding member 12.

In this embodiment the upper holding member 14 has a stepped shape as the top elements 4 have to be connected as well to the first base elements 2 as to the second base elements 3 which are arranged at different axial levels.

Connection areas 24, 25 are arranged between the lower holding member 12 and the upper holding member 14 such that a radial welding tool may have access to the connection areas 24, 25. In this embodiment the connection areas 24 and 25 are not on the same axial level.

FIG. 5 shows a detailed view of a part of the embodiment of FIG. 4. The outer conductors 102 protrude from the stator core 100 by a distance which is larger than the distance by which the inner conductors 103 protrude from the stator core 100. Hence the axial end sections 104 of the outer conductors 102 are more distanced from the stator core than the axial end sections 105 of the inner conductors 103.

Accordingly the first base elements 2 which embrace the parts of the axial end sections 104 of the outer conductors 102 are more distanced from the stator core than the second base elements 3, which embrace parts of the axial end sections 105 of the inner conductors 103.

The first base elements 2 comprise anchoring openings 23. Anchoring openings 23 may also be arranged in the second base elements 3 (not explicitly shown in the figure).

Resin of a body 11 of the lower holding member 12 (indicated by dashed lines) may enter the anchoring openings to provide a tight and reliable fixation between the first base elements 2 and the lower holding member 12.

The body 11 of the lower holding member 12 may comprise chamfered openings 22 (in the figure schematically indicated for one opening with dashed lines) for introducing the axial end sections 104.

FIG. 6 shows a detailed view of a part of a stator 200 in a side view. The lower holding member 12 comprises an axially extending protrusion 16. The protrusion defines an axial distance 26 to the top face 114 of the stator core 100.

Preferably, the lower holding member 12 comprises three equally distanced axially extending protrusions 16. These protrusions 16 provide for a defined horizontal orientation of the lower holding member 12.

FIG. 7 shows a detailed view of a part of the first embodiment of a stator 200 in a perspective view. A termination connection 18 is arranged on a termination side 106 of the stator core 100.

One of the first base elements 2 and a radially adjacent second base element 3 are made as a single piece which is a part of the termination connection 18. The termination connection 18 provides for an external electrical connection.

Similarly, a termination connection 18 may be arranged inside the stator core 100 (not shown in the figures).

Steps for a first method used for forming the first embodiment of a stator 200 are schematically shown in FIGS. 8-10.

Alternatively, conductors 102, 103 are directly introduced into a stator core 100. Alternatively, stator core templates 112, 113 (see FIGS. 11-13) can be used.

Radially outer conductors 102 and radially inner conductors 103 are positioned in slots 101 of a stator core 100, such that the axial end sections 104, 105 protrude from a first axial side 107 and a second axial side 106 (see FIG. 10) of the stator core 100.

In a further step axial end sections 104 of the radially outer conductors 102 are connected with first base elements 2 and ends 105 of radially inner conductors 103 are connected with second base elements 3.

The connection can be made with an axially directed laser tool 120.

The first base elements 2 may be arranged in an annular first region 13a of a lower holding member 12 and the second base elements 3 may be arranged in an annular second region 13b of the lower holding member 12. In the shown embodiment all base elements 2, 3 are arranged in a common lower holding member 12.

In a further step top elements of connection bridges (not shown in this figures) arranged in an annular upper holding member 14 may be connected to the base elements 2, 3 arranged in the lower holding member 12 at a first axial side 107 of the stator core.

The connection can be made with a radially directed laser tool 121.

Preferably similar steps are also performed on the second axial side 106 of the stator core 100.

For manufacturing the second embodiment of a stator, in a second method a first inner subassembly 20 (see FIG. 11) and an outer subassembly 21 (see FIG. 12) may be provided.

FIG. 11 schematically shows an inner subassembly 20 in a perspective view. Inner conductors 103 are arranged in slots of a stator core template 113.

The inner conductors 103 are connected to second base elements 3 arranged in a second region 13b of a lower holding member 12. The connection may be formed by axial welding. The lower holding member 12 also carries first base elements 2 which are arranged in the radial outer second region 13b of the lower holding member 12 and which are not yet connected to a conductor.

FIG. 12 shows an outer subassembly 21 in a perspective view. Outer conductors 102 are arranged in slots of a stator core template 112.

The outer conductors 102 are connected to first base elements 2 arranged in a first region 13a of a lower holding member 12. The connection may be formed by axial welding. The lower holding member 12 also carries second base elements 3 which are arranged in radially inner region 13b of the lower holding member 12 and which are not yet connected to a conductor.

FIG. 13 schematically shows steps of a first example of forming a stator 200.

The conductors 103 of the inner subassembly 20 are introduced into the slots 101 of a stator core 100 from a first axial side 107.

The conductors 102 of the outer subassembly 21 are introduced into the slots 101 of a stator core 100 from a second axial side 106.

The radially outer conductors 102 may then be connected to the first base elements 2 of the inner subassembly 20 on the first axial side 107 and the radially inner conductors 103 may be connected to the second base elements 3 (see FIG. 9) of the outer subassembly 21 on the second axial side 107.

In a further step, not shown in the figure, upper holding members may be placed adjacent to the lower holding members on both sides 106, 107 of the stator core 100 and top elements may be welded to base elements.

The invention claimed is:

1. A stator for a rotating electric machine, comprising:
   a stator core having a plurality of slots arranged in a circumferential direction of the stator core; and
   a plurality of conductors forming a stator winding, wherein:
   at least a radially outer conductor of the plurality of conductors and a radially inner conductor of the plurality of conductors are arranged along a radial direction of each slot of the plurality of slots, wherein respective axial end sections of the radially outer conductor and the radially inner conductor are protruding from respective slots of the plurality of slots on at least one side of the stator core;
   at least one pair of a radially outer conductor of the plurality of conductors arranged along a first slot of the plurality of slots and a radially inner conductor of a second slot of the plurality of slots circumferentially spaced from the first slot is electrically connected by a connection bridge; and
   the connection bridge comprises:
   a first base element and a second base element connected to the axial end sections of a respective conductor of the plurality of conductors by axial welding, and
   a top element that is connected to the first base element by welding from a radial outer side and to the second base element, after the first base element and the second base element are connected to the axial end sections of the respective conductor, by welding from a radial inner side and arranged at a larger distance from the stator core than a distance from the stator core to the first base element and the second base element.

2. The stator according to claim 1, wherein the first base element embraces at least one of a lateral part or an outwardly facing part of an outer surface of the respective axial end section of the radially outer conductor.

3. The stator according to claim 1, wherein the second base element embraces at least one of a lateral part or an inwardly facing part of an outer surface of the respective axial end section of the radially inner conductor.

4. The stator according to claim 1, wherein:
   the top element comprises a first connection end having a contact face in contact with a face of the first base element; and
   the top element comprises a second connection end having a contact face in contact with a face of the second base element.

5. The stator according to claim 4, wherein:
   an axial contact face of the first connection end is in contact with an axial face of the first base element; and
   an axial contact face of the second connection end of the top element is in contact with an axial face of the second base element.

6. The stator according to claim 1, the stator comprising a plurality of the connection bridges, wherein one or more of:
   first base elements are arranged within a first region of a lower holding member;
   second base elements are arranged within a second region of a lower holding member; or
   top elements are arranged within an upper holding member.

7. The stator according to claim 6, wherein one or more of the lower holding member or the upper holding member is annular.

8. The stator according to claim 6, wherein one or more of the lower holding member or the upper holding member comprises a body made of resin.

9. The stator according to claim 6, wherein one or more of the lower holding member or the upper holding member comprises at least one reference mark.

10. The stator according to claim 6, wherein one or more of the lower holding member or the upper holding member comprises at least one spacer element for defining an axial distance to one or more of the stator core or an axially adjacent holding member.

11. The stator according to claim 6, wherein the lower holding member comprises chamfered openings for introducing respective axial end sections of respective conductors of the plurality of conductors.

12. The stator according to claim 6, wherein:
   the first base element is arranged on a first axial level; and
   the second base element is arranged on a second axial level different from the first axial level.

13. The stator according to claim 12, wherein the second base element is arranged closer to the stator core than the first base element.

14. The stator according to claim 1, wherein one or more of the first base element or the second base element comprises anchoring openings at a lateral side.

15. The stator according to claim 1, wherein a number of one or more of first base elements or second base elements are connected to each other to form a termination connection on a termination side of the stator core.

16. The stator according to claim 1, wherein respective conductors of the plurality of conductors comprise respective stranded wires.

17. A connection bridge for connecting conductors arranged in slots arranged in a circumferential direction of a stator core of a stator, wherein the connection bridge comprises:
   a first base element and a second base element being connectable to respective axial end sections of the conductors by axial welding; and
   a top element configured to be connected to base elements by welding from a radial outer side or by welding from a radial inner side after the base elements are connected to the respective axial end sections of the conductors, wherein the top element is configured to be arranged at a larger distance from the stator core to the first base element and the second base element.

18. The connection bridge according to claim 17, wherein the top element comprises two contact faces for contacting respective faces of the first base element and the second base element.

19. A method for manufacturing a stator for a rotating electric machine, the stator comprising a stator core which has a plurality of slots arranged in a circumferential direction of the stator core and a plurality of conductors forming a stator winding, wherein at least a radially outer conductor and a radially inner conductor of the plurality of conductors are arranged along a radial direction of each slot of the plurality of slots, and respective axial end sections of respective conductors of the plurality of conductors protrude from respective slots of the plurality of slots on at least one side of the stator core, wherein respective axial end sections are connected by a connection bridge, said bridge comprising a first base element and a second base element connected to respective axial end sections of a respective conductor of the plurality of conductors and a top element connected to the first base element and the second base element, the method comprising:

first:
connecting at least one first base element to an axial end section of the radially outer conductor by axial welding, and connecting at least one second base element to the radially inner conductor by an axial end section of axial welding; and second:
connecting a top element to the first base element from a radial outer side, and connecting the top element to the second base element from a radial inner side.

20. The method according to claim 19, comprising one or more of:

providing a first region of a lower holding member carrying first base elements and placing the first region of the lower holding member close to the axial end sections of radially outer conductors;

providing a second region of the lower holding member carrying second base elements and placing the second region of the lower holding member to the axial end sections of radially inner conductors; or providing an upper holding member carrying top elements and placing the upper holding member close to the first region of the lower holding member and the second region of the lower holding member after having connected the first base elements to the axial end sections of the radially outer conductors and the second base elements to the axial end sections of the radially inner conductors.

21. The method according to claim 20, further comprising:

positioning the radially inner conductors and the radially outer conductors in respective slots of the plurality of slots of the stator core, wherein the axial end sections protrude from a first axial side and a second axial side of the stator core;

connecting the axial end sections of the radially outer conductors with the first base elements arranged in the first region of the lower holding member and the axial end sections of the radially inner conductors with the second base elements arranged in the second region of the lower holding member on the first axial side;

connecting the axial end sections of the radially outer conductors with the first base elements arranged in the first region of the lower holding member and axial end sections of radially inner conductors with second base elements arranged in a second region of a lower holding member on the second axial side; and connecting the upper holding member to the lower holding members on both sides, and by welding the top elements of the upper holding member to the second base elements of the second region of the lower holding member.

22. The method according to claim 20, further comprising:

providing the radially inner conductors in an inner stator template;

connecting the axial end sections of the radially inner conductors on a first axial side with the second base elements arranged in the second region of the lower holding member, which is fixed to a first region of a lower holding member of an opposite termination side, forming an inner subassembly;

providing the radially outer conductors in an outer stator template;

connecting the axial end sections of the radially outer conductors with the first base elements arranged in the first region of the lower holding member on a second axial side, which is connected to the second region of the lower holding member on the termination side, forming an outer subassembly;

introducing the conductors of the inner subassembly into respective slots of the plurality of slots the stator core from the first axial side;

introducing the conductors of the outer subassembly into the respective slots of the plurality of slots of the stator core from the second axial side opposite to the first axial side;

connecting the axial end sections of the radially outer conductors on the first axial side with the first base elements arranged in the first region of the lower holding member of the inner subassembly;

connecting the axial end sections of the radially inner conductors on the second axial side with the second base elements arranged the second region of the lower holding member of the outer subassembly; and connecting the upper holding member to the lower holding members on both axial sides by welding the top elements of the upper holding member to the base elements of the first region of the lower holding member, and by welding the top elements of the upper holding member to the base elements of the second lower region of the holding member.

* * * * *